Patented Jan. 23, 1951 2,538,753

UNITED STATES PATENT OFFICE 2,538,753

ALDEHYDE CONDENSATION RESINS

Raymond A. Barkhuff, Jr., and Lawrence M. Debing, Springfield, Mass., assignors to Monsanto Chemical Company, St. Louis, Mo., a corporation of Delaware No Drawing. Application September 6, 1945, Serial No. 614,812

5 Claims. (Cl. 260—43)

This invention relates to aldehyde condensation resins. More particularly the invention relates to condensation products of aldehydes with thiophene and other aldehyde reactable components.

It is an object of this invention to prepare resins from thiophene, aldehydes, and other aldehyde reactable components.

A further object is the preparation of resins from thiophene, formaldehyde and a phenol.

These and other objects are attained by reacting thiophene with an aldehyde in the presence of an acid catalyst and reacting the product with another aldehyde-reactable compound.

The following examples are given in illustration and are not intended as limitations on the scope of this invention. Where parts are mentioned, they are parts by weight.

Example I 84 parts of thiophene, 100 parts of formalin (37% formaldehyde), 1 part of 2-ethyl hexanol and 5 parts of concentrated sulfuric acid were mixed and the mixture refluxed at atmospheric pressure until the formaldehyde content of the water layer was less than 10%. 62 parts of phenol were then added and the mixture further refluxed at atmospheric pressure for 1.5 hours. The product was then neutralized with 5 parts of lime and dehydrated to provide a brittle, dark colored fusible resin which could be ground, mixed with hexamethylene tetramine and then molded by conventional molding methods to provide an insoluble, infusible resinous product.

Example II 84 parts of thiophene, 125 parts of formalin (37% formaldehyde), 4 parts of concentrated sulfuric acid and 1 part of 2-ethyl hexanol were agitated in an autoclave at 95-105° C. under 20 p. s. i. for 3 hours. 2 parts of lime and 55 parts of resorcinol were then added and the mixture refluxed for 70 minutes under 18-20 p. s. i. pressure. An additional 2 parts of lime were then added and the mixture dehydrated under vacuum to produce a dark red grindable resin. The resin may be compounded with hexamethylene tetramine and molded under heat and pressure to obtain an insoluble, infusible product.

Example III 84 parts of thiophene, 125 parts of formalin (37% formaldehyde), 4 parts of concentrated sulfuric acid and 1 part of 2-ethyl hexanol were agitated in an autoclave at 95-105° C. under 15-25 p. s. i. for 3 hours. 24 parts of phenol were then added and the mixture refluxed for 1 hours under atmospheric pressure. 27 parts of resorcinol were then added and the refluxing continued at atmospheric pressure for 30 minutes. 4 parts of lime were then added and the mixture was dehydrated under vacuum to obtain a dark brown, grindable phenol-resorcinol modified thiophene resin which may be thermoset as shown in Examples I and II.

Various modifications of the processes shown in the examples come within the scope of this invention, i. e., the formaldehyde may be substituted by other aldehydes; the phenolic component may be substituted by other phenols, ureas, aminotriazines such as melamine and other aldehyde-reactable materials, such as aniline, aryl sulfonamides, etc.; the conditions of the process may be varied; catalysts may be varied; and the wetting agent (2-ethyl hexanol) may be varied.

Aldehyde reactable phenols may be used to replace all or part of the phenol and/or resorcinol shown. Such phenols include homologues of phenol, e. g., cresols, xylenols, etc., and polyhydroxy phenols, e. g., catechol. The amount of phenolic compound based on 100 parts of thiophene may vary over an extremely wide range such as from about 25 to about 500 parts of phenolic constituent. The resultant products vary from tacky, soft, resins when a small amount of phenolic component is used to hard, brittle resins when the phenolic component predominates.

Formaldehyde may be replaced in the examples in whole or in part by aliphatic or aromatic, saturated or unsaturated aldehydes such as acetaldehyde, propionaldehyde, butyraldehyde, acrolein, crotonaldehyde, benzaldehyde, cinnamaldehyde, etc. The amount of aldehyde may be varied over a range of ¾ to 3 mols of aldehyde to 1 mol of aldehyde reactable component or mixtures of said components. For example, a mixture of 1 mol of thiophene and 1 mol of phenol may be reacted with 1½ to 6 mols of aldehyde.

The process, as shown in the examples, may be varied as to conditions of temperature and pressure with resultant variations in the duration of the process, e. g., by refluxing at elevated temperatures under pressures of 15-25 p. s. i. the reaction time may be materially shortened. It has also been found that the gradual addition of the thiophene to the aldehyde in small portions permits a higher reaction temperature and a further decrease in reaction time.

2-ethyl hexanol is shown in the example as a wetting agent. The amount and nature of the wetting agent may be varied and it may be omitted from the formulation. However, it is preferred to use small quantities of from about 0.5 to about 5 parts of wetting agent per 84 parts of thiophene.

For the condensation of thiophene with aldehyde to form the preliminary resin, concentrated sulfuric acid is shown in the examples as a condensation catalyst. Other well known acidic condensation catalysts may be used in varying quantities, e. g., hydrochloric acid, oxalic acid, sulfonated castor oil, etc. At increasing amounts of catalyst from 0.025 mol to 0.100 mol of catalyst to 1 mol of thiophene, increasing reaction rates are attainable.

Lime was shown as a reagent in the above examples to neutralize the acid catalyst and stabilize the resin against premature curing to the final infusible stage. Other bases or alkaline reacting materials may be substituted for the lime, such as alkalies, quaternary ammonium bases, ammonia, organic amines, etc.

Resins made by the process of this invention may be compounded with conventional additives such as fillers, pigments, lubricants, antioxidants, dyes, etc. They may be used as molding powders by mixing them with hexamethylene tetramine, other aldehyde-yielding bodies, such as paraform, paraldehyde, potentially reactive aldehyde condensation products such as methylol ureas, methylol melamines, or other well known accelerators and then molded at temperatures and pressures which vary widely according to their composition.

The resins may be used as coating compositions by dissolving them in a volatile solvent or mixture of volatile solvents such as alcohols, ketones, esters, aromatic hydrocarbons and then adding hexamethylene tetramine or other curing agents which release aldehydes, such as paraform, paraldehyde, potentially reactive aldehyde condensation products such as methylol ureas, methylol melamines, etc. The solution may be applied to the desired surface by conventional methods such as spraying, roll coating, dipping, etc. The solvent is removed by gentle heating at temperatures up to 110° C. and the coating then cured by baking at more elevated temperatures such as from about 125 to about 200° C.

The method of making the resins of this invention may be varied to obtain a varnish without first preparing a brittle resin. Such a varnish may be made by reacting under acid conditions, a mixture of a thiophene-aldehyde preliminary resin and an aldehyde-reactable component. The product is then made alkaline and further aldehyde added. This mixture is then reacted as desired and dehydrated.

*Example IV*

100 parts of thiophene, 130 parts of formalin (37% formaldehyde), 1 part of 2-ethyl hexanol and 5 parts of concentrated sulfuric acid were mixed and the mixture refluxed at atmospheric pressure until the fomaldehyde content of the water layer was less than 10%. To this preliminary resin were added 155 parts of phenol and 49.5 parts of cresylic acid and the mixture reacted at atmospheric pressure under refluxing conditions for 1 hour. The product was then neutralized with 5 parts of lime and made alkaline with 8 parts of ammonia and reacted further under reflux at atmospheric pressure for 15 minutes. The resultant syrup is soluble in solvents such as alcohol, acetone, methyl cellosolve, thiophene, dioxane, ethyl acetate, furfural, allyl alcohol, etc. Due to the presence of ammonia and unreacted formaldehyde, the varnish may be rendered infusible and insoluble by conventional baking treatments.

As shown previously for the resins of this invention, other aldehydes such as acetaldehyde, propionaldehyde, butyraldehyde, acrolein, crotonaldehyde, benzaldehyde, cinnamaldehyde or mixtures of aldehydes may be substituted for the formaldehyde. Other aldehyde-reactable compounds and mixtures of aldehyde-reactable compounds such as xylenol, catechol, resorcinol, melamine, urea, etc. may be substituted for the mixture of phenol and cresylic acids shown.

The catalysts, neutralizing agent and solvents may also be varied in making the varnish as in making the resins.

The syrups may be used in such applications as wire coating, post-forming, punch stock laminates, sandpaper adhesives, etc. The products have a high resistance to most chemicals and are quite flexible.

The varnishes may be used to modify various synthetic resins such as vinyl polymers, e. g., polyvinyl alcohol, polyvinyl acetals, polyvinyl esters amides or nitriles; copolymers of the above with each other; copolymers of vinyls with other compounds such as maleic anhydride and fumaronitrile; and the synthetic rubbers such as the copolymers of butadiene with styrene and acrylonitrile.

Thiophene-aldehyde resins modified with aldehyde reactable phenols have unusually high impact strength and low heat distortion values and are resistant to alkalies and most organic solvents.

The foregoing description is intended to be illustrative and not limitative of the invention as defined in the appended claims.

What is claimed is:

1. A process which comprises reacting 100 parts of thiophene with formaldehyde in the presence of 0.025 to 0.1 mol of an acid condensation catalyst per mol of thiophene at reflux temperature and at pressures from atmospheric to 25 p. s. i., and reacting the product with from 25 to 500 parts of a phenolic compound taken from the group consisting of phenol, cresols, and resorcinol under substantially the same conditions, the ratio of formaldehyde to the total amount of thiophene and phenolic compound varying on a molar basis between 0.75:1 and 3:1.

2. A process as in claim 1 wherein the phenolic compound is phenol.

3. A process as in claim 1 wherein the phenolic compound is resorcinol.

4. A process as in claim 1 wherein the phenolic compound is a mixture of phenol and cresols.

5. A process as in claim 1 wherein the phenolic compound is a mixture of phenol and resorcinol.

RAYMOND A. BARKHUFF, Jr.
LAWRENCE M. DEBING.

REFERENCES CITED

The following references are of record in the file of this patent:

UNITED STATES PATENTS

| Number | Name | Date |
| --- | --- | --- |
| 2,114,121 | Bender | Apr. 12, 1938 |
| 2,453,085 | Caesar et al. | Nov. 2, 1948 |

FOREIGN PATENTS

| Number | Country | Date |
| --- | --- | --- |
| 109,201 | Australia | Nov. 24, 1939 |

OTHER REFERENCES

Ellis-Chemistry of Synthetic Resins, vol. 2, pages 1457–8, 1463–4, 1514–5 pub. by Reinhold Pub. Co. New York, New York (1935).